United States Patent [19]

Nilssen

[11] Patent Number: 4,503,363
[45] Date of Patent: Mar. 5, 1985

[54] ELECTRONIC BALLAST CIRCUIT FOR FLUORESCENT LAMPS

[76] Inventor: Ole K. Nilssen, Caesar Dr., Rte. 5, Barrington, Ill. 60010

[21] Appl. No.: 456,276

[22] Filed: Feb. 22, 1983

[51] Int. Cl.³ .................... H05B 37/02; H05B 39/04; H05B 41/36
[52] U.S. Cl. .................... 315/225; 315/307; 315/119; 315/DIG. 7; 363/56
[58] Field of Search .............. 315/119, 127, 224, 225, 315/307, DIG. 7, DIG. 5; 363/55, 56

[56] References Cited

U.S. PATENT DOCUMENTS 4,005,335 1/1977 Perper .................... 315/DIG. 7
4,398,126 8/1983 Zuchtriegel .................... 315/127

*Primary Examiner*—Saxfield Chatmon

[57] ABSTRACT

With many fluorescent lighting fixtures, the voltages required at the sockets to start and operate the fluorescent lamps are so high as potentially to constitute a substantial electric shock hazard to persons having to service such fixtures. To mitigate this hazard, whenever socket voltages exceed certain levels, protective measures have to be provided.

Subject invention constitutes an electronic means for removing the socket voltages from a fluorescent lighting fixture in cases where a lamp is removed from one of its sockets.

The invention relates to situations wherein inverter-type ballasting is being used, and involves the use of an electronic means for disabling the inverter whenever the ballast has provided the relatively high output voltage required for lamp starting for a period longer than that normally required for the lamps to start. However, if the lamps do start within the normally required time period, thereby causing a reduction in the output voltage, the disabling of the inverter will not occur.

17 Claims, 1 Drawing Figure

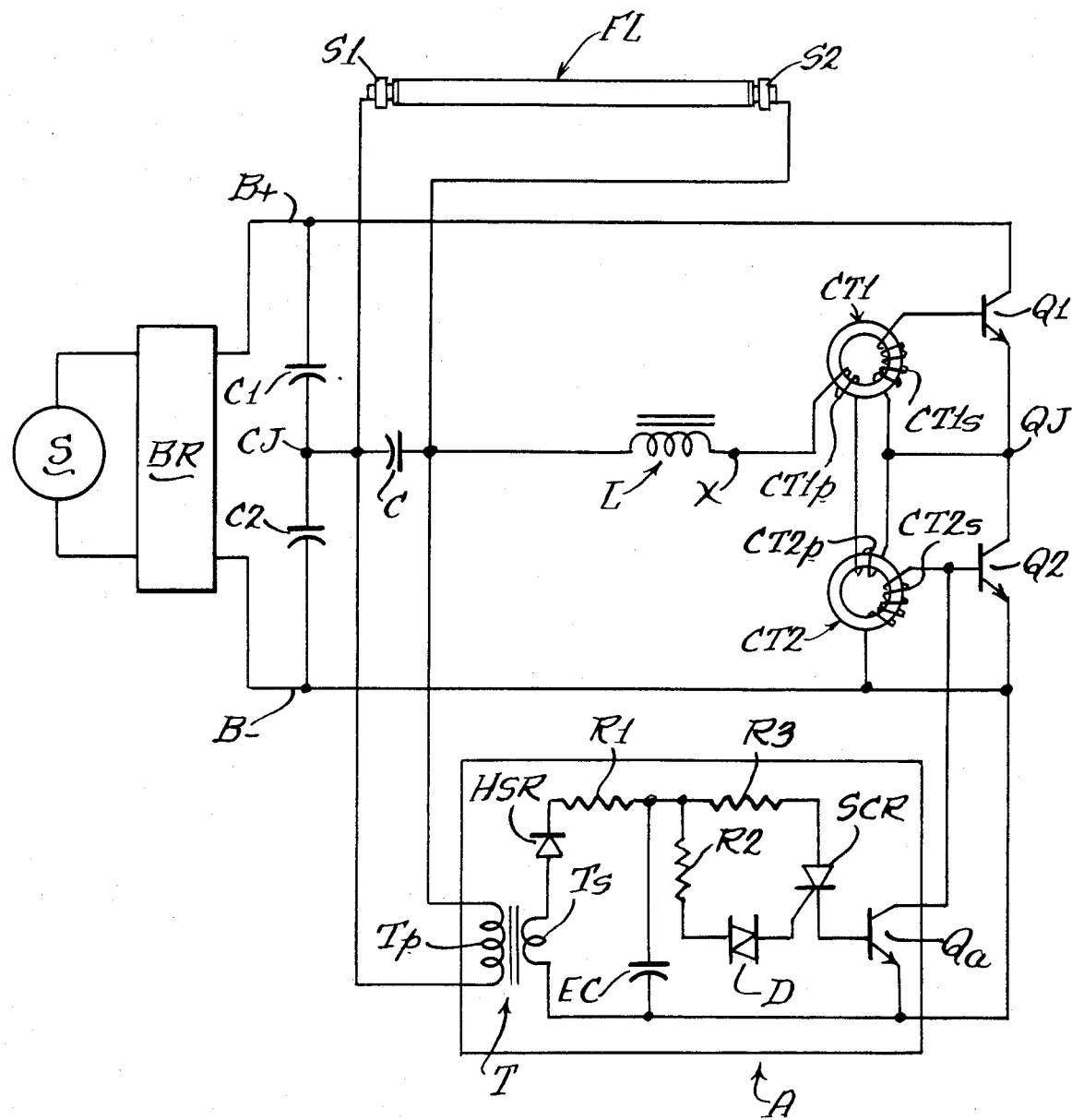

ELECTRONIC BALLAST CIRCUIT FOR FLUORESCENT LAMPS

BACKGROUND OF THE INVENTION

1. Field of the Invention

The present invention relates to inverter-type ballasts for fluorescent lamps, particularly to electronic means for disabling the inverter in case the lamp load is removed from the inverter-ballast output.

2. Description of Prior Art

With many fluorescent lighting fixtures, the voltages required at the sockets to start and operate the fluorescent lamps are so high as potentially to constitute a substantial electric shock hazard to persons having to service such fixtures.

To mitigate this hazard, it is customary to provide for circuit-interrupting lamp sockets. That way, whenever a fluorescent lamp is removed from one of its sockets, the line power feeding the fixture is interrupted; which thereby removes voltage from all the lamp sockets.

To the best of my knowledge, an electronic means for providing the equivalent or near-equivalent function of such circuit-interrupting lamp sockets have not been previously described in published literature, nor have such a product been offered for sale.

SUMMARY OF THE INVENTION

OBJECTS OF THE INVENTION

A first object of the present invention is that of providing for an electronic means that yields the near-equivalent function of circuit-interrupting lamp sockets for fluorescent lighting fixtures.

A second object is that of providing for an electronic means for removing the voltages from the lamp sockets in a fluorescent lighting fixture in case one of the fluorescent lamps therein is removed from one of its sockets.

A third object is that of providing for an electronic means to disable the inverter in an inverter-type fluorescent lamp ballast whenever the ballast has provided the relatively high output voltage required for fluorescent lamp starting for a period longer than that normally required for such lamps to start.

These as well as other objects, features and advantages of the present invention will become apparent from the following description and claims.

BRIEF DESCRIPTION

In its preferred embodiment, the present invention is implemented in an inverter-type ballast for fluorescent lamps. The inverter, which is of a push-pull self-oscillating type that has to be triggered into operation by way of a trigger pulse, comprises a pair of relatively high-power high-voltage switching transistors coupled together by way of a positive feedback-path.

If this positive feedback-path is broken for but a brief period, inverter oscillations will cease; and a new trigger pulse has to be provided before the inverter will restart.

One way to break the positive feedback-path is that of providing a momentary short-circuit across the base-emitter junction of one of the power transistors.

In the preferred embodiment, an auxiliary transistor is connected across the base-emitter junction of one of the two switching transistors. By causing this auxiliary transistor to turn ON momentarily, thereby bringing about a momentary short-circuit across this base-emitter junction, the positive feedback-path is broken and the inverter stops oscillating.

Means are provided by which a portion of the ballast output voltage is being rectified and used for charging a small energy-storing capacitor through a current-limiting resistor. With the lamp load present across the ballast output, this capacitor charges up to a voltage of about 9 Volt. Without the lamp load present, however, the capacitor charges up to about 34 Volt.

A Diac-triggered SCR discharge means is connected between the energy-storing capacitor and the base of the auxiliary transistor. This discharge means is arranged so as to break down when the voltage across the capacitor reaches about 24 Volt.

Thus, without the lamp load present across the ballast output, the capacitor will develop a voltage large enough to cause the discharge means to break down, thereby to cause the capacitor to dump its charge into the base-emitter junction of the auxiliary transistor. This action will momentarily turn ON the auxiliary transistor, thereby causing a momentary short-circuit across the base-emitter junction of one of the inverter switching transistors; which then causes the inverter to stop oscillating, thereby removing the ballast output voltage.

With the lamp load present, however, the voltage across the capacitor will not reach a magnitude high enough to cause break-down of the discharge means, and will therefore not affect the normal operation of the inverter.

BRIEF DESCRIPTION OF THE DRAWING

FIG. 1 shows the preferred embodiment of the invention.

DESCRIPTION OF THE PREFERRED EMBODIMENT

DESCRIPTION OF THE DRAWING

In FIG. 1, a source S of 120 Volt/60 Hz voltage is applied to a full-wave bridge rectifier BR, the unidirectional voltage output of which is applied directly between a B+ bus and a B− bus, with the positive voltage being connected to the B+ bus.

Between the B+ bus and the B− bus are connected a series-combination of two transistors Q1 and Q2 as well as a seriescombination of two energy-storing capacitors C1 and C2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with a junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected, by way of lamp sockets S1 and S2, in parallel circuit across capacitor C.

A transformer T is connected with its primary winding Tp across capacitor C. Its secondary winding Ts is connected between the B− bus and the anode of a high-speed rectifier HSR.

The cathode of rectifier HSR is connected to the positive terminal of an energy-storing electrolytic capacitor EC by way of a current-limiting resistor R1. The negative terminal of capacitor EC is connected directly to the B− bus.

A resistor R2 is connected in series with a Diac D to form a series-combination, which series-combination is connected between the positive terminal of capacitor EC and the gate of a Silicon-Controlled-Rectifier SCR. The anode of SCR is connected by way of a resistor R3 to the positive terminal of capacitor EC. The cathode of SCR is connected directly to the base of auxiliary transistor Qa. The collector of transistor Qa is connected directly to the base of transistor Q2, and the emitter of transistor Qa is connected directly to the emitter of transistor Q2.

The combination of transformer T, rectifier HSR, resistor R1, capacitor EC, resistor R2, Diac D, resistor R3, Silicon-Controller-Rectifier SCR, and transistor Qa is referred to as sub-assembly A.

Values and designations of the various parts of the circuit of FIG. 1 are listed as follows:
  Output of Source S:———120 Volt/60 Hz;
  Bridge rectifier BR:———a bridge of four 1N4004's;
  Capacitors C1 & C2:———100 uF/100 Volt Electrolytics;
  Transistors Q1 & Q2:———Motorola MJE13002's;
  Capacitor C:———15 nF/1000 Volt(High-Q);
  Inductor L:———130 turns of three twisted strands of #30 wire on a 3019P-L00-3C8 Ferroxcube Ferrite Pot Core with a 120 mil air gap;
  Transformers CT1 & CT2:———Wound on Ferroxcube Toroids 213t050 of 3E2A Ferrite Material with three turns of #26 wire for the primary windings and ten turns of #30 wire for the secondary windings;
  Transformer T:———On a 1811P-L00-3C8 Ferroxcube Ferrite Pot Core: 420 turns of #38 wire for the primary winding and 20 turns of #34 wire for the secondary winding;
  Rectifier R:———1N4154;
  Resistor R1:———1.2 KOhm/0.25 Watt;
  Capacitor EC:———68 uF/35 Volt Electrolytic;
  Resistor R2:———180 KOhm/0.25 Watt;
  Diac D:———General Electric ST-4;
  Resistor R3:———0.56 KOhm/0.25 Watt;
  SCR:———Motorola 2N5061;
  Transistor Qa:———Motorola 2N4401;
  Fluorescent Lamp FL:———Sylvania Octron F032/31K.

The frequency of inverter oscillation associated with the components values identified above is approximately 33 kHz.

DESCRIPTION OF OPERATION

The operation of the circuit of FIG. 1 may be explained as follows.

In FIG. 1, the source S represents an ordinary electric utility power line, the voltage from which is applied directly to the bridge rectifier identified as BR. This bridge rectifier is of conventional construction and provides for the rectified line voltage to be applied to the inverter circuit by way of the B+ bus and the B− bus.

The two energy-storing capacitors C1 and C2 are connected directly across the output of the bridge rectifier BR and serve to filter the rectified line voltage, thereby providing for the voltage between the B+ bus and the B− bus to be substantially constant. Junction CJ between the two capacitors serves to provide a power supply center tap.

The inverter circuit of FIG. 1, which represents a so-called half-bridge inverter, operates in a manner that is analogous with circuits previously described in published literature, as for instance in U.S. Pat. No. 4,184,128 entitled High Efficiency Push-Pull Inverters.

The inverter circuit is shown without any means for initiating inverter oscillation. However, once B+ power is applied, oscillation can be initiated simply by momentarily connecting a 50 nF capacitor between the B+ bus and the base of transistor Q2.

The output of the half-bridge inverter is a substantially squarewave 33 kHz AC voltage, which is provided between point X and junction CJ. Across this output is connected a near-resonant L-C series circuit—with the fluorescent lamp being connected in parallel with the tank-capacitor thereof.

The near-resonant action of the L-C series circuit provides for appropriate lamp starting and operating voltages, as well as for proper lamp current limiting; which is to say that it provides for appropriate lamp ballasting.

(Resonant or near-resonant ballasting has been described in previous publications, as for instance in U.S. Pat. No. 3,710,177 entitled Fluorescent Lamp Circuit Driven Initially at Lower Voltage and Higher Frequency).

The essential feature of the present invention, which involves that of disabling the inverter in case the fluorescent lamp is removed, or if it does not start, is accomplished by the sub-assembly referred to as A in FIG. 1.

The input to sub-assembly A is connected directly across the fluorescent lamp; and the output is connected directly across the base-emitter junction of transistor Q2.

With the inverter oscillating, but without the lamp load connected, the voltage across capacitor C (and thereby across the input to sub-assembly A) is approximately 500 Volt RMS; which implies that the peak voltage across the output of transformer T is about 34 Volt. Thus, capacitor EC will charge up to this peak voltage within a time period that is determined partly by the magnitude of the resistance of resistor R1 and the magnitude of the capacitance of capacitor EC and partly by the fact that charging takes place by way of a half-wave rectified sinewave. In the present situation, the net resulting time to reach 24 Volt on the capacitor is about 250 milli-seconds.

If the voltage on capacitor EC reaches about 24 Volt, the Diac D breakes down, thereby providing current to trigger the SCR into its conducting state. With the SCR conducting, current flows from capacitor EC and into the base of transistor Qa—the peak current being limited by resistor R3 to about 40 mAmp.

With that much current flowing into its base, transistor Qa exhibits a relatively low resistance between its collector and emitter; which resistance is adequately low to prevent transistor Q2 from being turned ON—with the net resulting effect that inverter oscillation ceases.

In other words, if the inverter circuit is triggered into oscillation, and if the lamp is not connected (or if it does not ignite), oscillations will persist for but a fraction of a second before the inverter will be shut down by action of sub-assembly A, thereby removing voltage from the lamp sockets. Similarly, if the inverter is oscillating and the lamp is removed, it will take but a fraction of a second before the inverter shuts down.

However, if the inverter is triggered into oscillation while a properly functioning lamp is connected, the lamp will ignite before the voltage across capacitor EC has reached a magnitude high enough to cause Diac D to break down and thereby to trigger the SCR and cause circuit shut-down.

As soon as the lamp ignites, the voltage across capacitor C (and thereby across the input of sub-assembly A) will drop from 500 Volt RMS to only about 140 Volt RMS. Thus, the peak voltage output of transformer T will be reduced from about 34 Volt to about 9 Volt; which is not enough to charge capacitor EC to the 24 Volt required for causing circuit shut-down.

The voltage required for causing break-down of the Diac itself is actually about 28 Volt. However, there are negative voltage spikes present at the base of transistor Q2, and they have the effect of causing the Diac to break down when the voltage on capacitor EC is only about 24 Volt.

COMMENTS

It is noted that, in FIG. 1, instead of a using a separate transformer T to provide for the voltage required to charge capacitor EC, a secondary winding on inductor L could just as well have been used.

It is also noted that it is possible to use a special single semiconductor device, such as a Silicon Bidirectional Switch, instead of the combination of a Diac and an SCR.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:

1. In an inverter-type fluorescent lamp ballast, said ballast comprising a pair of ballast output terminals operative to permit connection with and loading by a fluorescent lamp and to provide current-limited operating voltage therefor, the magnitude of said operating voltage being relatively large when a fluorescent lamp is not loading said ballast output and relatively low when a fluorescent lamp is loading said ballast output, said ballast also comprising a self-oscillating inverter with a pair of oscillation control terminals, said oscillation control terminals being operative upon application thereacross of a trigger pulse to cause the inverter to initiate oscillations, and, after the inverter has been initiated into oscillation, by momentary application thereacross of a relatively low impedance shunt to stop the inverter from oscillating, the improvement comprising:

voltage sensing means connected in circuit across said ballast output terminals and operative to generate a primary DC voltage across a pair of primary DC output terminals, the magnitude of said primary DC voltage being proportional to that of the voltage present across said ballast output terminals;

impedance means connected in circuit with said voltage sensing means and operative to limit the amount of current that can flow from said primary DC outut terminals;

capacitor means connected in circuit with said primary DC output terminals and operative to be charged therefrom, whereby a time-dependent secondary DC voltage is developed across said capacitor means, said secondary voltage being provided across a pair of secondary DC output terminals;

voltage threshold means connected in circuit with said secondary DC output terminals and operative, in case the magnitude of said secondary DC voltage reaches a certain pre-established threshold level, to provide a DC output current from said pair of secondary DC output terminals; and shunt means connected in circuit with said secondary DC output terminals and across said oscillation control terminals, said shunt means being operative to receive said DC output current and, as a consequence thereof, to cause a relatively low impedance shunt to be momentarily applied across said pair of oscillation control terminals, thereby to stop said inverter from oscillating;

whereby, in case the voltage across said ballast output terminals remains high enough for a time long enough to cause the magnitude of said secondary DC voltage to reach said threshold level, the inverter will cease oscillating and the voltage across said ballast output terminals will disappear.

2. The improvement in claim 1 wherein the magnitude of said secondary DC voltage will not reach said threshold level as long as a fluorescent lamp is loading said ballast output terminals, but will reach said threshold level if a fluorescent lamp is not loading said ballast output terminals.

3. The improvement of claim 1 wherein said ballast is operative to be powered from a regular electric utility power line.

4. A fluorescent lamp ballast adapted to be powered from an ordinary electric utility power line and comprising:

a pair of ballast output terminals operative to permit connection with and loading by a fluorescent lamp and to provide current-limited operating voltage therefor, the magnitude of said operative voltage being relatively large when a fluorescent lamp is not loading said ballast output terminals and relatively low when a fluorescent lamp is loading said ballast output terminals;

inverter means operative to provide said current-limited operating voltage;

control means operative: (i) upon receipt of a trigger pulse to initiate said inverter into operation, thereby to enable said inverter means to provide said operating voltage at said ballast output terminals; and (ii) upon receipt of a momentary control signal to disable said inverter means, thereby to remove said operating voltage from said ballast output terminals;

voltage sensing means connected in circuit with said ballast output terminals and operative to provide a first DC voltage output, the magnitude of this first DC voltage output being proportional to the magnitude of said operating voltage, said first DC voltage output being characterized by having an internal impedance operative to limit the magnitude of the direct current available from said first DC voltage output;

capacitor means connected in circuit with said first DC voltage output and operative to provide a second DC voltage output, said second DC voltage output being a time-delayed derivative of said first DC voltage output; and threshold means connected in circuit with said second DC voltage output and operative to provide said momentary control signal to said control means in case the magnitude of said second DC voltage output is larger than a pre-established threshold-level;

whereby, whenever the inverter is disabled, the ballast draws substantially no power from the power line; and the inverter may then be re-triggered into operation without having to disconnect the ballast from the power line, thereby to restore said operating voltage at the ballast output terminals.

5. The fluorescent lamp ballast of claim 4 wherein the magnitude of said second DC voltage output will not exceed said threshold-level in case a fluorescent lamp is loading said ballast output terminals, but will exceed said threshold-level in case a fluorescent lamp is not loading said ballast output terminals.

6. A fluorescent lamp ballast adapted to be powered from an ordinary electric utility power line and comprising:

a pair of output terminals operative to permit connection with and loading by a fluorescent lamp and to provide current-limited operating voltage therefor, the magnitude of said operating voltage being relatively large when a fluorescent lamp is not loading said output terminals and relatively low when a fluorescent lamp is loading said output terminals;

control means operative upon receipt of a momentary control signal to remove said operating voltage from said output terminals;

voltage sensing means connected in circuit with said output terminals and operative to provide a first DC voltage output, the magnitude of this first DC voltage output being proportional to the magnitude of said operating voltage, said first DC voltage output being characterized by having an internal impedance operative to limit the magnitude of the direct current available from said first DC voltage output;

capacitor means connected in circuit with said first DC voltage output and operative to provide a second DC voltage output, said second DC voltage output being a time-delayed derivative of said first DC voltage output; and threshold means connected in circuit with said second DC voltage output and operative to provide said momentary control signal to said control means in case the magnitude of said second DC voltage output exceeds a pre-established threshold-level;

whereby, after said momentary control signal has been provided to said control means, the ballast draws substantially no power from the power line, and said output terminals are substantially free from electric shock hazard.

7. The fluorescent lamp ballast of claim 6 wherein the magnitude of said second DC voltage output will not exceed said threshold-level in case a fluorescent lamp is loading said output terminals, but will exceed said threshold-level in case a fluorescent lamp is not loading said output terminals.

8. A fluorescent lamp ballast adapted to be powered from an ordinary electric utility power line and comprising:

a pair of output terminals operative to permit connection with and loading by a fluorescent lamp and to provide current-limited operating voltage therefor;

control means operative upon receipt of a control signal to remove said operating voltage from said output terminals;

voltage sensing means connected in circuit with said output terminals and operative to provide a DC voltage output, the magnitude of this DC voltage output being a time-delayed proportion of the magnitude of said operating voltage; and threshold means connected in circuit with said DC voltage output and operative to provide said control signal to said control means in case the magnitude of said DC voltage output exceeds a pre-established threshold-level;

whereby, after said control signal has been provided to said control means, said output terminals are substantially free from electric shock hazard.

9. The fluorescent lamp ballast of claim 8 wherein the magnitude of said DC voltage output will not exceed said threshold-level in case a fluorescent lamp is loading said output terminals, but will exceed said threshold-level in case a fluorescent lamp is not loading said output terminals.

10. The fluorescent lamp ballast of claim 9 wherein the magnitude of said DC voltage output will not exceed said threshold-level within the time it normally takes between the moment that operating voltage is applied across a fluorescent lamp and the moment when that fluorescent lamp ignites.

11. The fluorescent lamp ballast of claim 9 wherein said operating voltage is removed from said output terminals within a pre-determined period of time in case said fluorescent lamp is not connected with said output terminals.

12. The fluorescent lamp ballast of claim 11 wherein said pre-determined period of time is shorter than ten seconds.

13. The fluorescent lamp ballast of claim 9, said ballast being operative to be powered from an ordinary electric utility power line.

14. The fluorescent lamp ballast of claim 13 wherein, in case a fluorescent lamp is not connected with said output terminals, said operating voltage is removed from said output terminals within a pre-determined period of time after power has been applied to said ballast.

15. The fluorescent lamp ballast of claim 14 wherein said pre-determined period of time is shorter than ten seconds.

16. A fluorescent lamp ballast adapted to be powered from the AC voltage on an ordinary electric utility power line, said ballast comprising:

rectifier means connected with said AC voltage and operative to provide a DC voltage output;

push pull inverter means connected with said DC voltage output and conditionally operative to provide a current-limited ballast output voltage at a pair of ballast output terminals, said inverter means being operable by way of receiving control signals at a set of control terminals to be triggered into and triggered out of oscillation repeatedly and without the need for the ballast to be disconnected from said AC voltage, said ballast output terminals being adapted to connect with and to be loaded by a fluorescent lamp and to provide operating voltage therefor, the magnitude of this operating voltage being relatively large when a fluorescent lamp is not loading said ballast output terminals, relatively low when a fluorescent lamp is loading said ballast output terminals, said substantially zero whenever the inverter is not oscillating; and sensor and bi-stable switch control means operative to provide control signals to said control terminals such as to trigger the inverter out of oscillation whenever the magnitude of said ballast output voltage has exceeded a pre-determined magnitude for longer than a relatively brief period of time.

17. A ballast for a gas discharge lamp, comprising:

a source of DC voltage;

a conditionally self-oscillating push pull inverter connected with said DC voltage and operative to provide current-limited AC output voltage at a set of ballast output terminals, said inverter, if not oscillating even though connected with said DC voltage, being capable of being triggered into oscillation at any time and without having to provide for temporary removal or dimishment of said DC voltage; and means for causing said inverter to cease oscillating whenever the magnitude of the AC output voltage has exceeded a pre-determined level for longer than a relatively brief period of time, thereby essentially removing said AC voltage from said ballast output terminals until such time as the inverter is retriggered into oscillation said means comprising bi-stable switching means.

* * * * *